United States Patent
Wu (10) Patent No.: US 10,462,720 B2
(45) Date of Patent: Oct. 29, 2019

(54) DEVICE AND METHOD FOR HANDLING EVOLVED LONG-TERM EVOLUTION NETWORK

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 45 days.

(21) Appl. No.: 15/892,348

(22) Filed: Feb. 8, 2018

(65) Prior Publication Data

US 2018/0227816 A1     Aug. 9, 2018

Related U.S. Application Data

(60) Provisional application No. 62/456,673, filed on Feb. 9, 2017.

(51) Int. Cl.
*H04W 68/02*      (2009.01)
*H04W 36/08*      (2009.01)
(Continued)

(52) U.S. Cl.
CPC ....... *H04W 36/08* (2013.01); *H04W 36/0033* (2013.01); *H04W 72/04* (2013.01);
(Continued)

(58) Field of Classification Search
None
See application file for complete search history.

(56) References Cited

U.S. PATENT DOCUMENTS

| 8,264,979 | B2 * | 9/2012 | Wu | H04W 48/08 370/252 |
| 8,615,230 | B2 * | 12/2013 | Wu | H04W 36/0066 455/424 |

(Continued)

OTHER PUBLICATIONS

3GPP TS 36.331 V14.1.0 (Dec. 2016), Technical Specification, 3rd Generation Partnership Project; Technical Specification Group Radio Access Network; Evolved Universal Terrestrial Radio Access (E-UTRA); Radio Resource Control (RRC); Protocol specification (Release 14), Dec. 2016.

(Continued)

*Primary Examiner* — Sithu Ko
(74) *Attorney, Agent, or Firm* — Winston Hsu (57) ABSTRACT

A first BS for handling the eLTE network for a communication device comprises a storage device for storing instructions and a processing circuit coupled to the storage device. The processing circuit is configured to execute the instructions stored in the storage device. The instructions comprise receiving a radio resource control (RRC) Connection Request message; transmitting a RRC Connection Setup message; receiving a RRC Connection Setup Complete message; receiving a UE-EUTRA-Capability information element (IE); transmitting a radio bearer (RB) configuration configuring a data radio bearer (DRB); communicating at least one packet data convergence protocol (PDCP) service data unit (SDU) of the DRB with the communication device; determining to initiate a handover for the communication device to a second BS; transmitting a Handover Request message to the second BS; receiving a Handover Request Acknowledge message from the second BS; and transmitting the Handover Command message to the communication device.

2 Claims, 7 Drawing Sheets

(51) Int. Cl.
  *H04W 72/04* (2009.01)
  *H04W 76/10* (2018.01)
  *H04W 36/00* (2009.01)
  *H04W 8/22* (2009.01)
  *H04W 36/12* (2009.01)

(52) U.S. Cl.
  CPC .............. *H04W 76/10* (2018.02); *H04W 8/22* (2013.01); *H04W 36/0022* (2013.01); *H04W 36/12* (2013.01)

(56) References Cited

U.S. PATENT DOCUMENTS

| | | | | |
|---|---|---|---|---|
| 9,510,387 | B2* | 11/2016 | Vesterinen | H04W 8/02 |
| 2017/0208510 | A1* | 7/2017 | Pudney | H04W 4/70 |
| 2017/0265172 | A1* | 9/2017 | Futaki | H04W 16/14 |
| 2017/0318473 | A1* | 11/2017 | Futaki | H04W 16/14 |
| 2018/0182859 | A1* | 6/2018 | Lee | H01L 29/4958 |
| 2019/0159088 | A1* | 5/2019 | Shi | H04W 36/08 |
| 2019/0191348 | A1* | 6/2019 | Futaki | H04W 36/12 |

OTHER PUBLICATIONS

Search Report dated Jun. 6, 2018 for EP application No. 18155628.3, pp. 1-6.
Huawei, HiSilicon, "Functions and protocols of eLTE connecting to NGC", 3GPP TSG-RAN WG2 Meeting #96, R2-168195, Nov. 14-18, 2016, Reno, Nevada, US, XP051177863, pp. 1-4.
Huawei, HiSilicon, "Network selection and access control framework for eLTE", 3GPP TSG-RAN WG2 Meeting #96, R2-168196, Nov. 14-18, 2016, Reno, Nevada, US, XP051177864, pp. 1-3.
Intel Corporation, "LTE to eLTE evolution path and specifications", 3GPP TSG-RAN WG2 Meeting #96, R2-168503, Nov. 14-18, 2016, Reno, USA, XP051178084, pp. 1-5.
Intel Corporation, "Initial access and mode selection in (e)LTE networks", 3GPP TSG-RAN WG2 Meeting #96, R2-168533, Nov. 14-18, 2016, Reno, USA, XP051178114, pp. 1-4.
Huawei, "LTE-NR interface functions and procedures", 3GPP TSG-RAN WG3 Meeting #93, R3-161755, Aug. 22-26, 2016, Gothenburg, Sweden, XP051127588, pp. 1-6.

* cited by examiner

DEVICE AND METHOD FOR HANDLING EVOLVED LONG-TERM EVOLUTION NETWORK

CROSS REFERENCE TO RELATED APPLICATIONS

This application claims the benefit of U.S. Provisional Applications No. 62/456,673 filed on Feb. 9, 2017, which is incorporated herein by reference.

BACKGROUND OF THE INVENTION

1. Field of the Invention

The present invention relates to a device and a method used in a wireless communication system, and more particularly, to a device and a method of handling evolved long-term evolution (eLTE) network in a wireless communication system.

2. Description of the Prior Art

A long-term evolution (LTE) system are developed by the 3rd Generation Partnership Project (3GPP) as a successor of a universal mobile telecommunications system (UMTS), for further enhancing performance of the UMTS to satisfy the increasing needs of users.

SUMMARY OF THE INVENTION

The present invention therefore provides a communication device for handling the eLTE network to solve the abovementioned problem.

A first BS for handling the eLTE network for a communication device comprises a storage device for storing instructions and a processing circuit coupled to the storage device. The processing circuit is configured to execute the instructions stored in the storage device. The instructions comprise receiving a Radio Resource Control (RRC) Connection Request message from the communication device; transmitting a RRC Connection Setup message to the communication device to establish a RRC connection between the communication device and the first BS, in response to the RRC Connection Request message; receiving a RRC Connection Setup Complete message comprising first information indicating support of eLTE, from the communication device; receiving a UE-EUTRA-Capability information element (IE) from the communication device or from a core network (CN), wherein the UE-EUTRA-Capability IE comprises second information indicating support of eLTE; transmitting a radio bearer (RB) configuration configuring a data radio bearer (DRB) on the RRC connection, to the communication device; communicating at least one first packet data convergence protocol (PDCP) service data unit (SDU) of the DRB with the communication device; determining to initiate a handover for the communication device to a second BS; transmitting a Handover Request message for the communication device to the second BS, in response to the determination, wherein the Handover Request message comprises the UE-EUTRA-Capability IE; receiving a Handover Request Acknowledge message comprising a Handover Command message, from the second BS, in response to the Handover Request message; and transmitting the Handover Command message to the communication device.

A first BS for handling the eLTE network comprises a storage device for storing instructions and a processing circuit coupled to the storage device. The processing circuit is configured to execute the instructions stored in the storage device. The instructions comprise receiving information indicating support of eLTE for a first communication device, in a RRC Connection Setup Complete message or in a UE-EUTRA Capability IE; transmitting an eLTE configuration for configuring the first communication device to use the eLTE, to the communication device according to the information; determining to initiate a handover for the first communication device to a second BS; transmitting a first Handover Request message for the first communication device, to the second BS, in response to the determination, wherein the first Handover Request message comprises the eLTE configuration; receiving a first Handover Request Acknowledge message comprising a first Handover Command message, from the second BS, in response to the first Handover Request message; and transmitting the first Handover Command message to the first communication device.

A second BS for handling the eLTE network comprises a storage device for storing instructions and a processing circuit coupled to the storage device. The processing circuit is configured to execute the instructions stored in the storage device. The instructions comprise receiving a first Handover Request message for the first communication device, from a first BS or from a CN; determining to establish at least one first connection to a NextGen Core (NGC) network for the first communication device, when the first Handover Request message indicates that the first communication device supports the eLTE; transmitting a first Handover Request Acknowledge message comprising a first Handover Command message to the first BS, in response to the first Handover Request message, wherein the first Handover Command message configures the eLTE to the first communication device and is transmitted by the first BS to the first communication device; and receiving a first Handover Complete message responding to the first Handover Command message, from the first communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
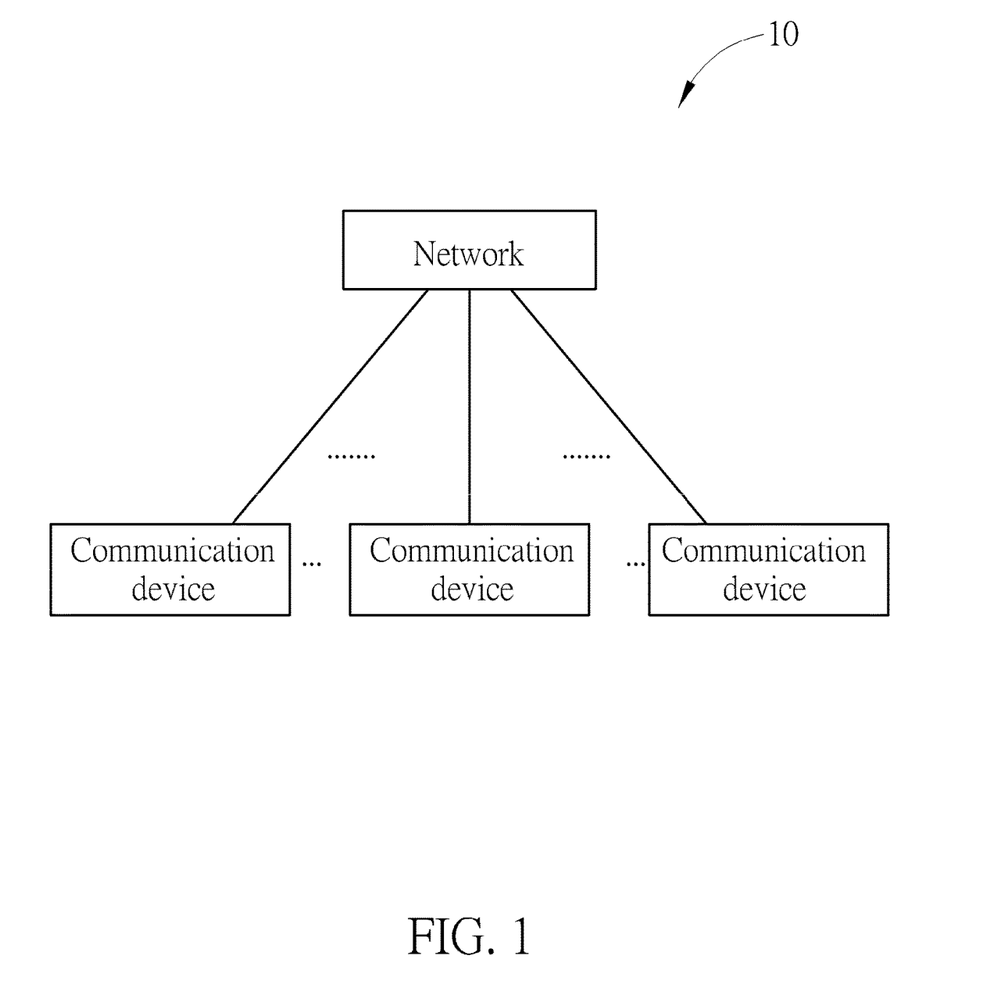
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and the communication device may communicate with each other via one or multiple cells (e.g., multiple carriers) belonging to one or multiple base stations (BSs).

In FIG. 1, the network and the communication devices are simply utilized for illustrating the structure of the wireless communication system 10. Practically, the network may comprise at least one of a long-term evolution (LTE) network and a new radio (NR) network. The LTE network may comprise at least one of an evolved universal terrestrial radio access network (E-UTRAN) including at least one evolved Node-B (eNB) and an Evolved Packet Core (EPC). The NR network may comprise a fifth generation (5G) radio access network including at least one 5G BS (or called gNB) and a Next Generation Core (NGC). The 5G BS connects to the NGC. An evolved-LTE (eLTE) eNB is an evolution of the eNB that supports connectivity to the NGC and may or may not connect to the EPC. In this case, the eLTE eNB may be considered in the LTE network or the NR network.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

The UE may know that an eNB connects to the NGC network from system information broadcast by the eNB (i.e., eLTEeNB). Ina typical configuration, the UE attaches to the NGC network via the eNB by new radio (NR) non-access stratum (NAS) messages. The UE may indicate that the UE supports the eLTE in a RRCConnectionRequest message or in a RRCConnectionSetupComplete message such that the eNB can establish at least one connection to the NGC (e.g., a NG-C connection to Access and Mobility Management Function (AMF) or a NG-U connection to User Plane Function (UPF)) for the UE.

Figure 2:
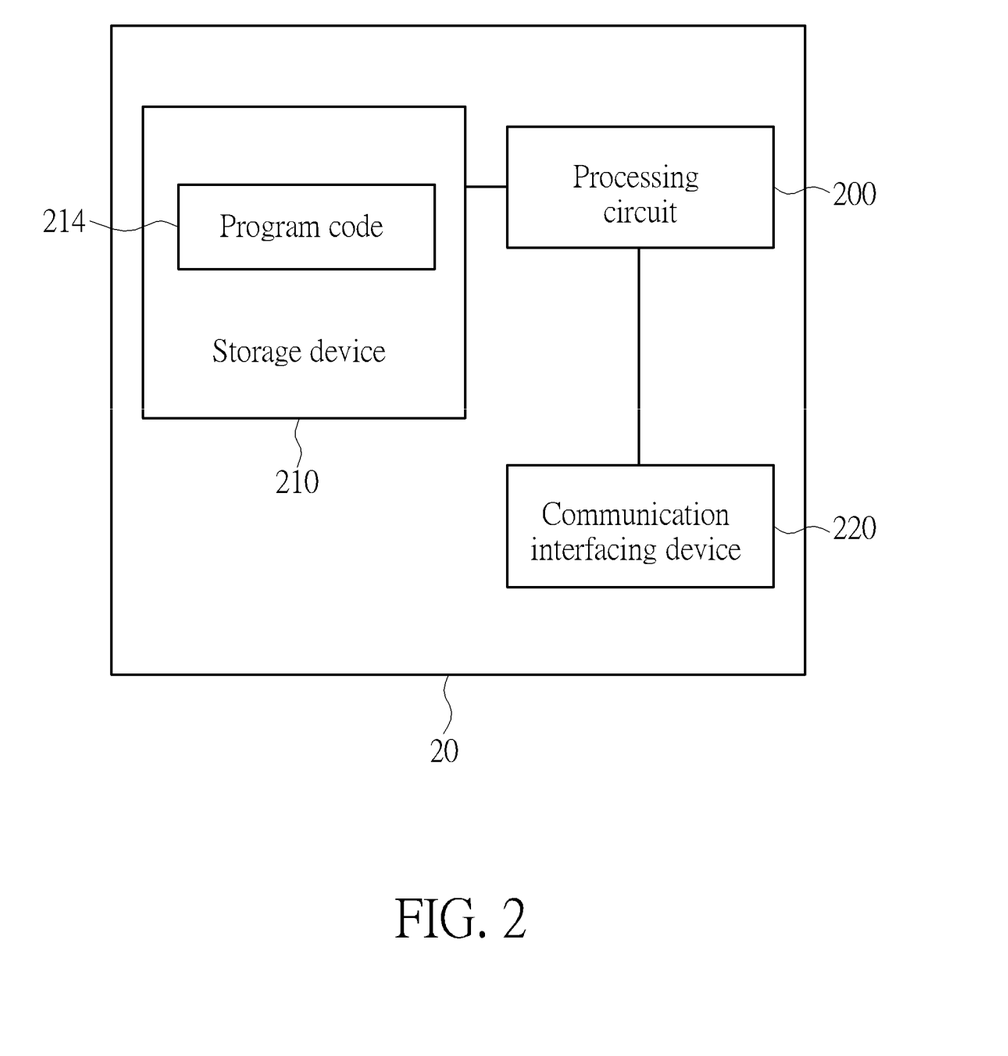
FIG. 2 is a schematic diagram of a communication device according to an example of the present invention.

FIG. 2 is a schematic diagram of a communication device 20 according to an example of the present invention. The communication device 20 may be a communication device or the network (e.g., a BS) shown in FIG. 1, but is not limited herein. The communication device 20 may include at least one processing circuit 200 such as microprocessor(s) or Application Specific Integrated Circuit(s) (ASIC(s)), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 comprises at least one transceiver and is used to transmit and receive signals (e.g., data, messages and/or packets) according to processing results of the processing circuit 200.

In the following embodiments, a UE is used for representing a communication device in FIG. 1, to simplify the illustration of the embodiments. A BS is used for representing any kind of BS in the network in FIG. 1.

A first scenario for the present invention is illustrated as follows. ABS capable of connecting to an EPC network and a NGC network does not know whether a UE supports an eLTE or not during a radio resource control (RRC) connection establishment procedure. Thus, the BS cannot decide to connect to the NGC network for the UE as early as possible, if the UE supports the eLTE. A second scenario for the present invention is illustrated as follows. A UE may need to be handed over to a second BS from a first BS. However, the second BS does not know that the UE supports the eLTE and the second BS can only setup a S1-C connection to a Mobility Management Entity (MME) for the UE and a S1-U connection to a Serving Gateway for the UE. Thus, the UE cannot be served by the second BS with the eLTE.

Figure 3:
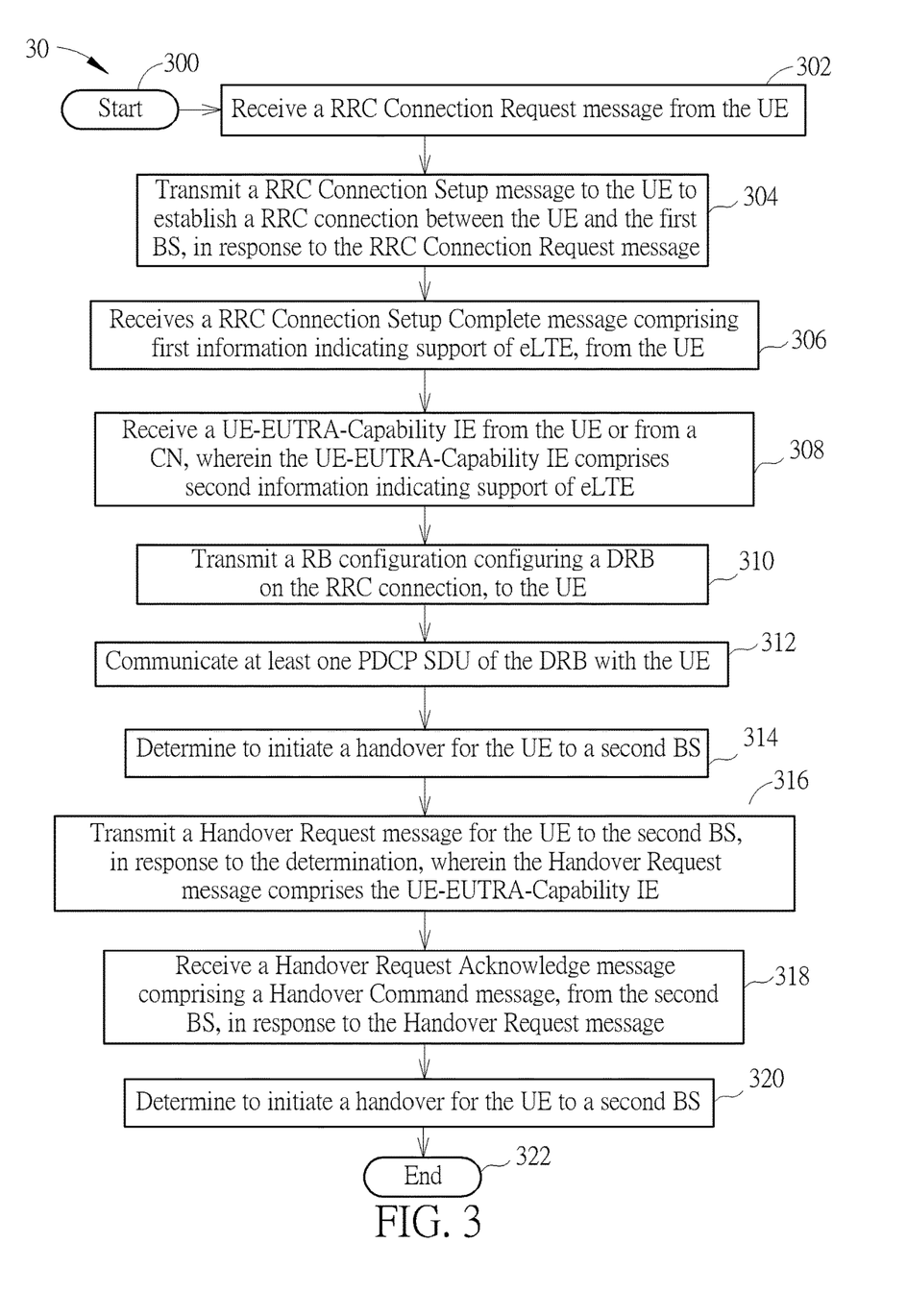
FIG. 3 is a flowchart of a process according to an example of the present invention.

A process 30 as shown in FIG. 3 can be utilized in a first BS in the network in FIG. 1, for handling an eLTE network for a UE and includes the following steps:

Step 300: Start.

Step 302: Receive a RRC Connection Request message from the UE.

Step 304: Transmit a RRC Connection Setup message to the UE to establish a RRC connection between the UE and the first BS, in response to the RRC Connection Request message.

Step 306: Receives a RRC Connection Setup Complete message comprising first information indicating support of eLTE, from the UE.

Step 308: Receive a UE-EUTRA-Capability information element (IE) from the UE or from a core network (CN), wherein the UE-EUTRA-Capability IE comprises second information indicating support of eLTE.

Step 310: Transmit a radio bearer (RB) configuration configuring a data radio bearer (DRB) on the RRC connection, to the UE.

Step 312: Communicate at least one packet data convergence protocol (PDCP) service data unit (SDU) of the DRB with the UE.

Step 314: Determine to initiate a handover for the UE to a second BS.

Step 316: Transmit a Handover Request message for the UE to the second BS, in response to the determination, wherein the Handover Request message comprises the UE-EUTRA-Capability IE.

Step 318: Receive a Handover Request Acknowledge message comprising a Handover Command message, from the second BS, in response to the Handover Request message.

Step 320: Transmit the Handover Command message to the UE.

Step 322: End.

The following examples may be applied to the process 30.

In one example, the first information is received in the RRC Connection Request message instead of in the RRC Connection Setup Complete message.

In one example, the first information may indicate/comprise a CN type (e.g. NGC) to indicate support of eLTE. In one example, the first BS may establish a connection (e.g. NG-C connection) to a NGC network (hereinafter referred as to NGC) in response to/according to the first information.

In one example, since the Handover Request message includes the second information indicating that the UE supports the eLTE, the second BS determines to set up at least one connection to the NGC for the UE instead of an EPC network (hereinafter referred as to EPC), according to the second information. The second BS transmits a first message to the NGC to setup the at least one connections. The first message may include information or a configuration of the UE.

In one example, if the UE connects to the EPC via the first BS before the handover, when the NGC receives the first message, the NGC transmits a second message including the second information or the RB configuration of the UE to the EPC to inform that the UE connects to the NGC, in response to the first message. The EPC releases a UE context of the UE in response to the second message. The NGC transmits a first acknowledge or a first confirm message to the second BS in response to the first message. The EPC transmits a second acknowledge or a second confirm message to the NGC, in response to the second message.

In one example, the second BS transmits a path switch request message to the NGC (e.g., AMF) to indicate the NGC to transmit DL data for the UE to the second BS, when detecting that the UE connects to the second BS. The NGC (e.g., AMF) transmits a path switch request acknowledge in response to the path switch request message. The path switch request message may or may not be the first message.

In one example, when the UE receives the Handover Command message, the UE moves (e.g., connects) to a cell of the second BS and transmits a Handover Complete message to the second BS via the cell. After the handover, the second BS transmits at least one second PDCP SDU (e.g., received from the NGC (e.g., UPF)) on the DRB to the UE and transmits at least one third PDCP SDU received from the UE on the DRB to the NGC (e.g., UPF).

In one example, the Handover Command message configures the UE to use the eLTE. In one example, the Handover Command message does not configure the UE to use the eLTE (e.g., the second BS does not support eLTE or the NGC is congested). In one example, the second BS triggers a relocation from the EPC to the NGC for the UE after the UE hands over to the second BS, if the Handover Command message does not configure the UE to use the eLTE. That is, the first UE performs a LTE handover from the first BS (e.g., not supporting the eLTE) to the second BS (e.g., supporting the eLTE). Then, the second BS triggers the relocation from the EPC to the NGC for the UE. Though the UE still connects to the second BS before and after the relocation, the second BS transmits other Handover Command message (e.g., intra-eNB handover) to the UE to notify the relocation.

Figure 4:
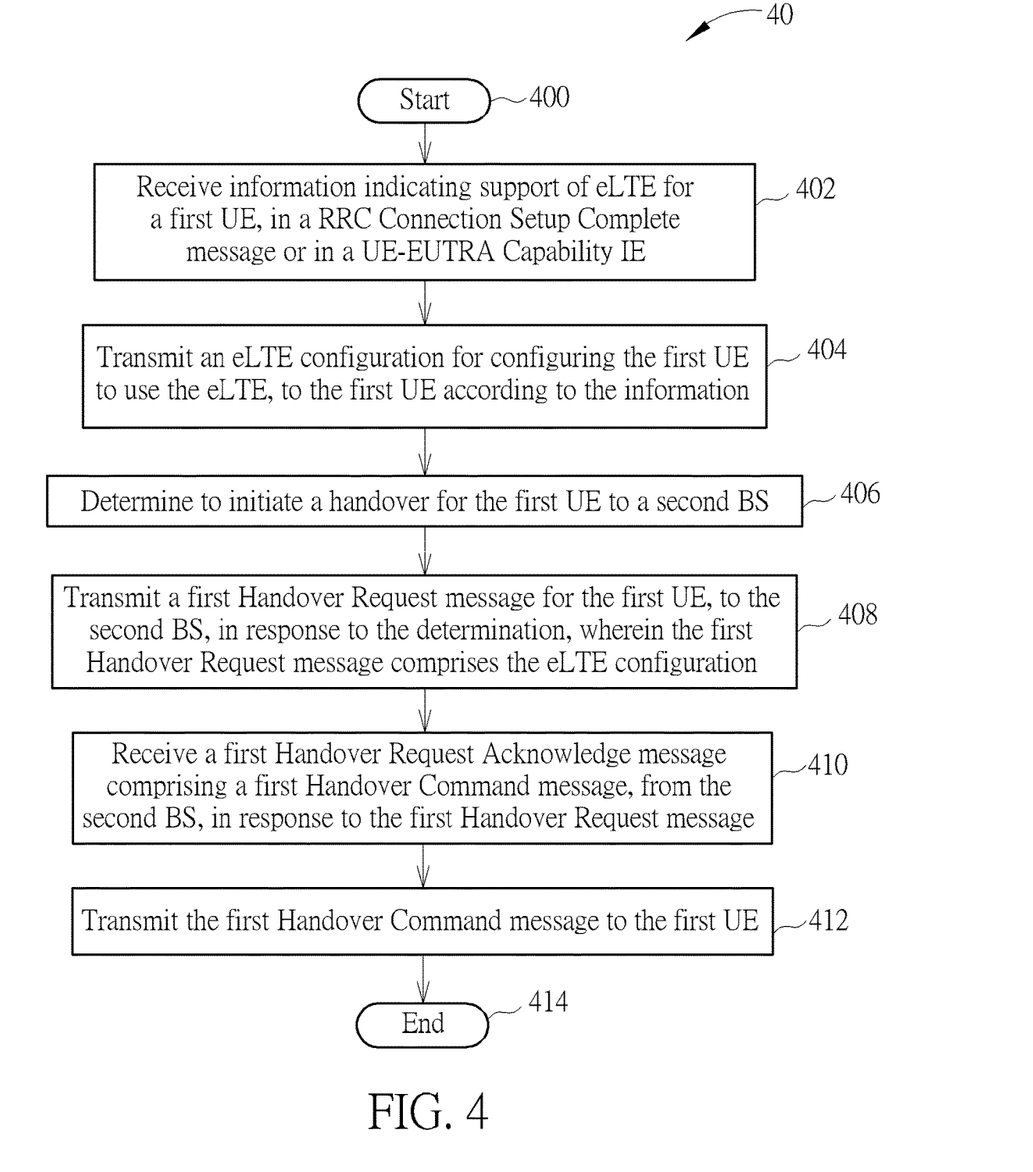
FIG. 4 is a flowchart of a process according to an example of the present invention.

A process 40 as shown in FIG. 4 can be utilized in a first BS in the network in FIG. 1 and includes the following steps:

Step 400: Start.

Step 402: Receive information indicating support of eLTE for a first UE, in a RRC Connection Setup Complete message or in a UE-EUTRA Capability IE.

Step 404: Transmit an eLTE configuration for configuring the first UE to use the eLTE, to the first UE according to the information.

Step 406: Determine to initiate a handover for the first UE to a second BS.

Step 408: Transmit a first Handover Request message for the first UE, to the second BS, in response to the determination, wherein the first Handover Request message comprises the eLTE configuration.

Step 410: Receive a first Handover Request Acknowledge message comprising a first Handover Command message, from the second BS, in response to the first Handover Request message.

Step 412: Transmit the first Handover Command message to the first UE.

Step 414: End.

The following examples may be applied to the process 40.

In one example, the eLTE configuration configuring the UE to use the eLTE is transmitted to the UE in the RRC Connection Setup message, or in a RRC Connection Reconfiguration message on a RRC connection.

In one example, the first Handover Request message or the UE-EUTRA Capability IE includes the first information.

In one example, the first BS may transmit the first Handover Request message to the second BS when the first UE supports eLTE.

In one example, the first BS may transmit a second Handover Request message to the second BS or a third BS for handing over a second UE to the second BS, when the second UE does not support eLTE or is not configured by the first BS an eLTE configuration. The second UE may not include the information indicating support of the eLTE in a RRC Connection Setup Complete message or in a UE-EUTRA Capability IE transmitted to the first BS. The second BS or the third BS may transmit a second Handover Request Acknowledge message to the first BS in response to the second Handover Request message. The second Handover Request Acknowledge message comprises a second Handover Command message. The second BS or the third BS transmits the second Handover Command message to the second UE. In one example, the first Handover Command message may configure the first UE to use the eLTE and the second Handover Command message may configure the second UE to use LTE (i.e. not using the eLTE).

The information may be the first or second information in the process 30.

The examples applied to the process 30 can be applied to the process 40, and is not narrated herein.

Figure 5:
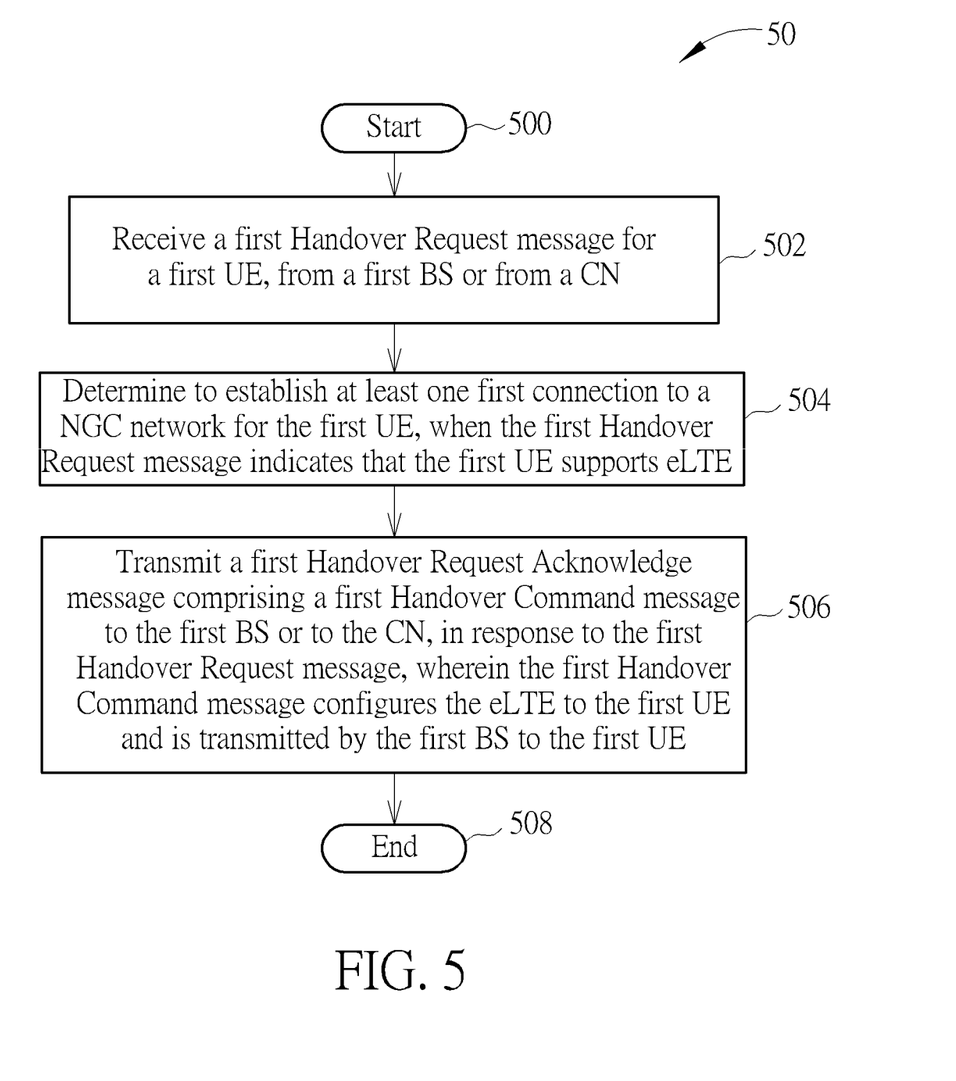
FIG. 5 is a flowchart of a process according to an example of the present invention.

A process 50 as shown in FIG. 5 can be utilized in a second BS in the network in FIG. 1 and includes the following steps:

Step 500: Start.

Step 502: Receive a first Handover Request message for a first UE, from a first BS or from a CN.

Step 504: Determine to establish at least one first connection to a NGC network for the first UE, when the first Handover Request message indicates that the first UE supports eLTE.

Step 506: Transmit a first Handover Request Acknowledge message comprising a first Handover Command message to the first BS or to the CN, in response to the first Handover Request message, wherein the first Handover Command message configures the eLTE to the first UE and is transmitted by the first BS to the first UE.

Step 508: Receive a first Handover Complete message responding to the first Handover Command message, from the first UE.

Step 510: End.

The following examples may be applied to the process 50.

In one example, the second BS receives a second Handover Request message for a second UE, from the first BS. When the second Handover Request message indicates that the second UE does not support the eLTE, the second BS determines to establish at least one second connection to an EPC. Then, the second BS transmits a second Handover Request Acknowledge message comprising a second Handover Command message to the first BS, in response to the second Handover Request message. The second BS transmits the second Handover Request message to the second UE. The second Handover Command message configures the UE to use the LTE (i.e., not using the eLTE).

The examples applied to the process 30 can be applied to the process 50, and is not narrated herein.

Figure 6:
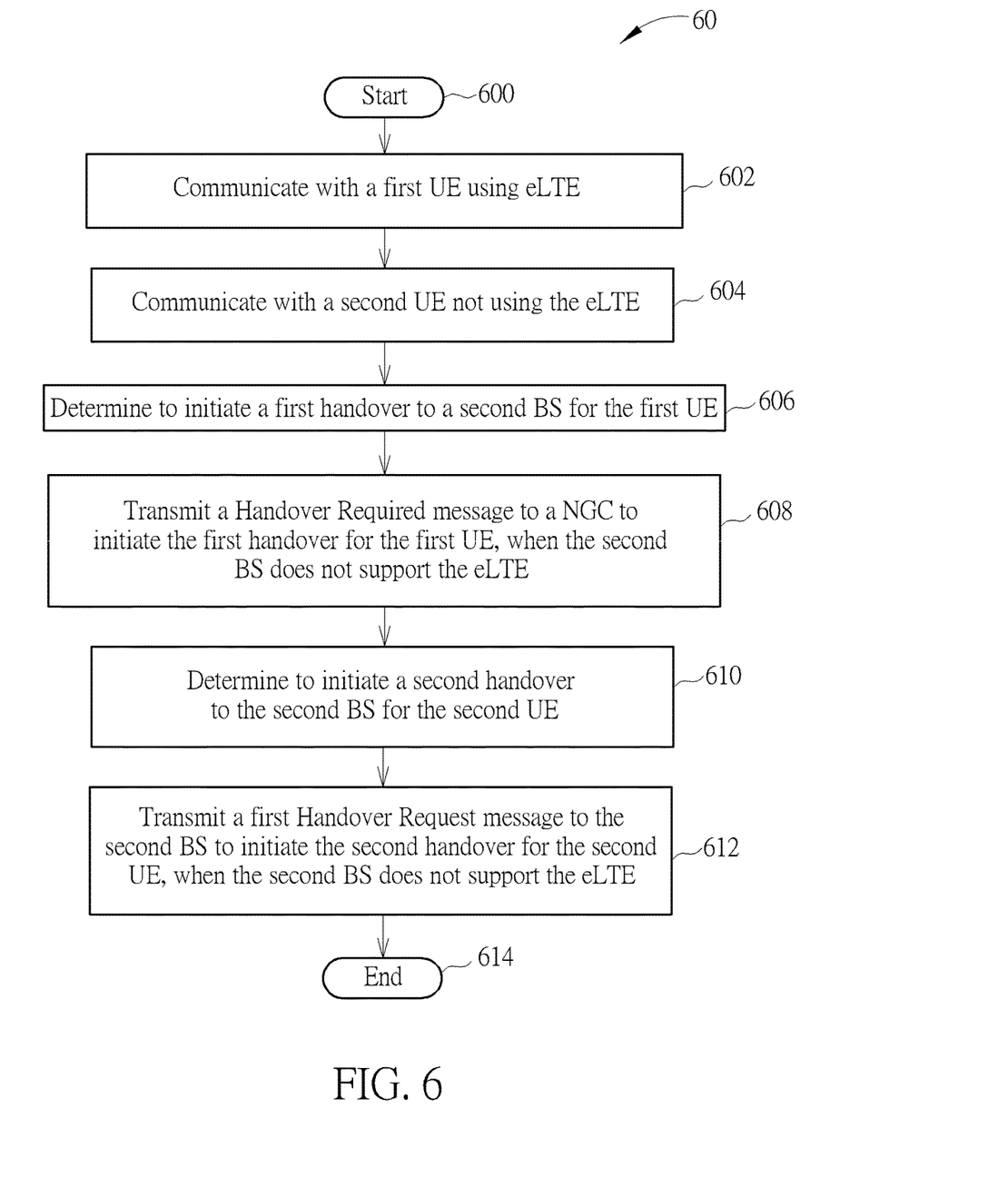
FIG. 6 is a flowchart of a process according to an example of the present invention.

A process 60 as shown in FIG. 6 can be utilized in a first BS in the network in FIG. 1 and includes the following steps:

Step 600: Start.

Step 602: Communicate with a first UE using eLTE.

Step 604: Communicate with a second UE not using the eLTE.

Step 606: Determine to initiate a first handover to a second BS for the first UE.

Step 608: Transmit a Handover Required message to a NGC to initiate the first handover for the first UE, when the second BS does not support the eLTE.

Step 610: Determine to initiate a second handover to the second BS for the second UE.

Step 612: Transmit a first Handover Request message to the second BS to initiate the second handover for the second UE, when the second BS does not support the eLTE.

Step 614: End.

The following examples may be applied to the process 60.

In one example, the first BS and the second BS connects to each other.

In one example, the NGC transmits a message to request an EPC connecting to the second BS to prepare the first handover for the first UE. The EPC transmits a second Handover Request message to the second BS in response to the message.

In one example, the first Handover Required message indicates that the first UE supports the eLTE as the Handover Request message described in the processes above. In one example, the first Handover request message indicates the second UE supports the eLTE. In one example, the second Handover Request message indicates that the first UE supports the eLTE. In one example, the message transmitted by the NGC to the EPC indicates that the first UE supports the eLTE. In one example, an information indicating that the first UE supports the eLTE may be included in the first Handover Required message, the message transmitted by the NGC to the EPC, the first Handover Request message or the second Handover Request message.

Figure 7:
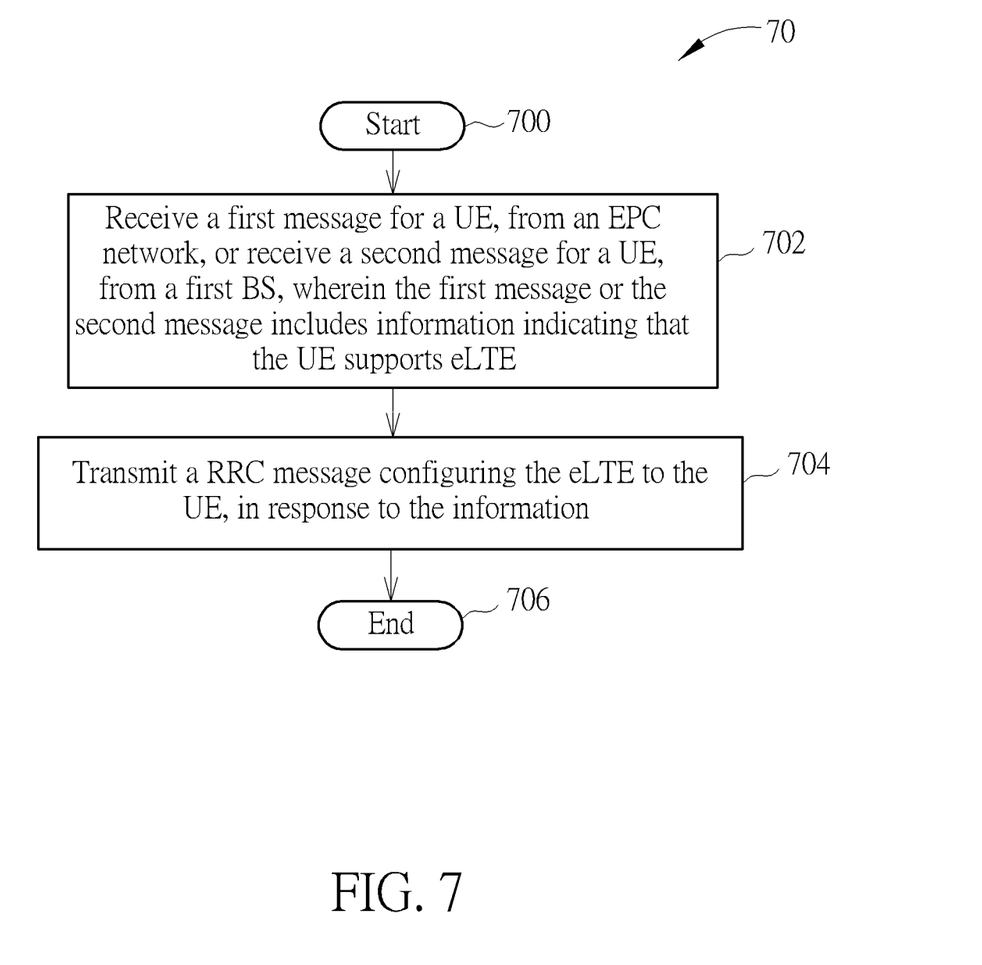
FIG. 7 is a flowchart of a process according to an example of the present invention.

A process 70 as shown in FIG. 7 can be utilized in a second BS in the network in FIG. 1 and includes the following steps:

Step 700: Start.

Step 702: Receive a first message for a UE, from an EPC network, or receive a second message for a UE, from a first BS, wherein the first message or the second message includes information indicating that the UE supports eLTE.

Step 704: Transmit a RRC message configuring the eLTE to the UE, in response to the information.

Step 706: End.

The following examples may be applied to the process 70.

In one example, the RRC message is a RRCConnectionReconfiguration message or a Handover Command message. The RRC message includes an eLTE configuration. The first message is a S1 Application Protocol (AP) message and the second message is an X2 AP message. In one example, the first message is an Initial Context Setup Request message, a Handover Request message or a Path Switch Request Acknowledge message. In one example, the second message is a Handover Request message. In one example, the RRC message is generated by the second BS and is directly transmitted by the second BS to the UE. In case of the handover, other Handover Command message configures the UE to use the LTE (i.e., does not configure the UE to use the eLTE) and is comprised in a Handover Request Acknowledgement message in response to the Handover Request message does not configure the UE to use the eLTE. After the handover to the second BS, the second BS transmits the RRC message to the UE to configure the eLTE to the UE (i.e., a relocation of a CN from the EPC to the NGC for the UE). The UE starts using the eLTE to communicate with the second BS according to the RRC message. The UE transmits a RRC response message responding to the RRC message, to the second BS. The UE may transmit a NAS message to the NGC via the second BS in response to the RRC message.

In one example, the second BS establishes at least one first connection to the NGC, when receiving the first message or the second message. In one example, the second BS establishes at least one second connection to the NGC, when receiving the NAS message.

The following examples may be applied to the process 30-70.

In one example, the CN comprises an EPC or a NGC. The EPC may comprise a MME and/or a serving gateway. The NGC comprises an AMF and/or a UPF.

In one example, the second BS determines to configure the UE to use the eLTE in the Handover Command message, when the Handover Request message indicates that the UE supports the eLTE. When the UE receives the eLTE configuration in the Handover Command message, the UE applies the eLTE configuration to communicate with the second BS. The second BS receives the Handover Complete message from the UE in response to the Handover command message.

In one example, the second BS determines to configure other UE not to use the eLTE in the other Handover Command message, when the other Handover Request message indicates that the other UE does not support the eLTE. The second BS receives the other Handover Complete message from the other UE in response to the other Handover Command message.

In one example, the UE receives an eLTE configuration configuring the UE to use the eLTE, from the second BS. In one example, the UE receives the eLTE configuration from the first BS, and the second BS configures the UE to keep applying (e.g., using) the eLTE configuration. After the handover to the second BS, the UE and the second BS communicate with each other using the eLTE.

In one example, the eLTE configuration includes a Quality-of-Service (QoS) flow configuration configuring a mapping of a QoS flow to a DRB. In one example, the eLTE configuration may include a Protocol Data Unit (PDU) Session identity. In one example, the eLTE configuration indicates the UE to communicate with the NGC network using at least one NGC/NR NAS protocol.

In one example, the UE-EUTRA-Capability includes information that the UE supports at least one of an Access stratum release, a UE category, Physical layer parameters, Radio Frequency (RF) parameters and measurement parameters.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling an eLTE network. The second BS can know that whether the UE supports the eLTE earlier such that the UE can be served by the second BS with the eLTE. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling an evolved long-term evolution (LTE) (eLTE) network for a communication device, comprising:
    a storage device; and
    a processing circuit, coupled to the storage device, wherein the storage device stores, and the processing circuit is configured to execute instructions of:
    receiving a Radio Resource Control (RRC) Connection Request message, from the communication device;
    transmitting a RRC Connection Setup message to the communication device to establish a RRC connection between the communication device and the first BS, in response to the RRC Connection Request message;
    receiving a RRC Connection Setup Complete message comprising first information indicating support of eLTE, from the communication device;
    receiving a User Equipment-Evolved Universal Terrestrial Radio Access (UE-EUTRA)-Capability information element (IE) from the communication device or from a core network (CN), wherein the UE-EUTRA-Capability IE comprises a second information indicating support of eLTE;
    transmitting a radio bearer (RB) configuration configuring a data radio bearer (DRB) on the RRC connection, to the communication device;
    communicating at least one packet data convergence protocol (PDCP) service data unit (SDU) of the DRB with the communication device;
    determining to initiate a handover for the communication device to a second BS;
    transmitting a Handover Request message for the communication device to the second BS, in response to the determination, wherein the Handover Request message comprises the UE-EUTRA-Capability IE;
    receiving a Handover Request Acknowledge message comprising a Handover Command message, from the second BS, in response to the Handover Request message; and
    transmitting the Handover Command message to the communication device.

2. The first BS of claim 1, wherein the Handover Command message configures the communication device to use the eLTE.

* * * * *